(12) United States Patent
Chang et al.

(10) Patent No.: US 8,931,358 B2
(45) Date of Patent: Jan. 13, 2015

(54) BALL SCREW WITH A DUST-PROOF AND LUBRICATING DEVICE

(75) Inventors: Che Kang Chang, Taichung (TW); Dian-Yu Jan, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 348 days.

(21) Appl. No.: 13/548,215

(22) Filed: Jul. 13, 2012

(65) Prior Publication Data
US 2014/0013887 A1 Jan. 16, 2014

(51) Int. Cl.
*F16H 25/22* (2006.01)

(52) U.S. Cl.
USPC .............................. 74/89.44; 74/89.3; 184/19

(58) Field of Classification Search
CPC ............ F16H 57/0497; F16H 25/2418; F16H 5/0406; F16H 25/2219; F16H 25/2214; F01L 2810/02; F16C 33/102
USPC ................. 74/89.44, 89.4, 89.3; 184/19, 102; 277/549, 300–311; 384/241
See application file for complete search history.

(56) References Cited

U.S. PATENT DOCUMENTS

| | | | | |
|---|---|---|---|---|
| 1,937,949 A | * | 12/1933 | Flather et al. | 82/137 |
| 2,320,353 A | * | 6/1943 | Ernst et al. | 74/89.43 |
| 2,476,575 A | * | 7/1949 | Arragg | 384/241 |
| 3,454,136 A | * | 7/1969 | Stark | 184/6.12 |
| 3,678,776 A | * | 7/1972 | Patterson | 74/89.4 |
| 4,022,295 A | * | 5/1977 | Breuers | 184/15.1 |
| 4,077,492 A | * | 3/1978 | Inoue | 184/64 |
| 5,050,707 A | * | 9/1991 | Wilhelmsen | 184/87 |
| 6,364,058 B1 | * | 4/2002 | Nishide et al. | 184/5 |
| 6,568,508 B2 | * | 5/2003 | West et al. | 184/5 |
| 6,578,852 B2 | * | 6/2003 | Nakagawa | 277/628 |
| 6,595,327 B2 | * | 7/2003 | Keller | 184/5 |
| 6,619,148 B2 | * | 9/2003 | Nishide | 74/89.44 |
| 7,234,368 B1 | * | 6/2007 | Lin et al. | 74/89.44 |
| 7,568,554 B2 | * | 8/2009 | Umber et al. | 184/55.2 |
| 7,748,284 B2 | * | 7/2010 | Vierheilig et al. | 74/89.44 |
| 2002/0056330 A1 | * | 5/2002 | Nishide | 74/89.44 |
| 2002/0185336 A1 | * | 12/2002 | West et al. | 184/5 |
| 2005/0241419 A1 | * | 11/2005 | Yatsushiro et al. | 74/89.4 |

* cited by examiner

*Primary Examiner* — William Kelleher
*Assistant Examiner* — Valentin Craciun
(74) *Attorney, Agent, or Firm* — Patent Office of Bang Shia (57) ABSTRACT

A ball screw with a dust-proof and lubricating device comprises: a screw, a nut, a plurality of balls, an oil-absorbing member, a return unit, and two dust-proof members. The nut includes an axial oil-guiding hole, a plurality of radial oil holes in communication with the oil-guiding hole and the helical groove of the nut, and an oil-feeding hole in communication with one of the radial oil holes. The oil-absorbing member is disposed in the oil-guiding hole and the radial oil holes. The return unit is disposed in the nut to enable the turning and circulation of the balls. The two dust-proof members are located at both ends of the axial hole. The ball screw can still be lubricated when it is disposed in a vertical position, and the dust-proof and lubricating device which won't add axial length to the nut.

4 Claims, 10 Drawing Sheets

BALL SCREW WITH A DUST-PROOF AND LUBRICATING DEVICE

BACKGROUND OF THE INVENTION

1. Field of the Invention

The present invention relates to a ball screw, and more particularly to a ball screw with a dust-proof and lubricating device.

2. Description of the Prior Art

Figure 1:
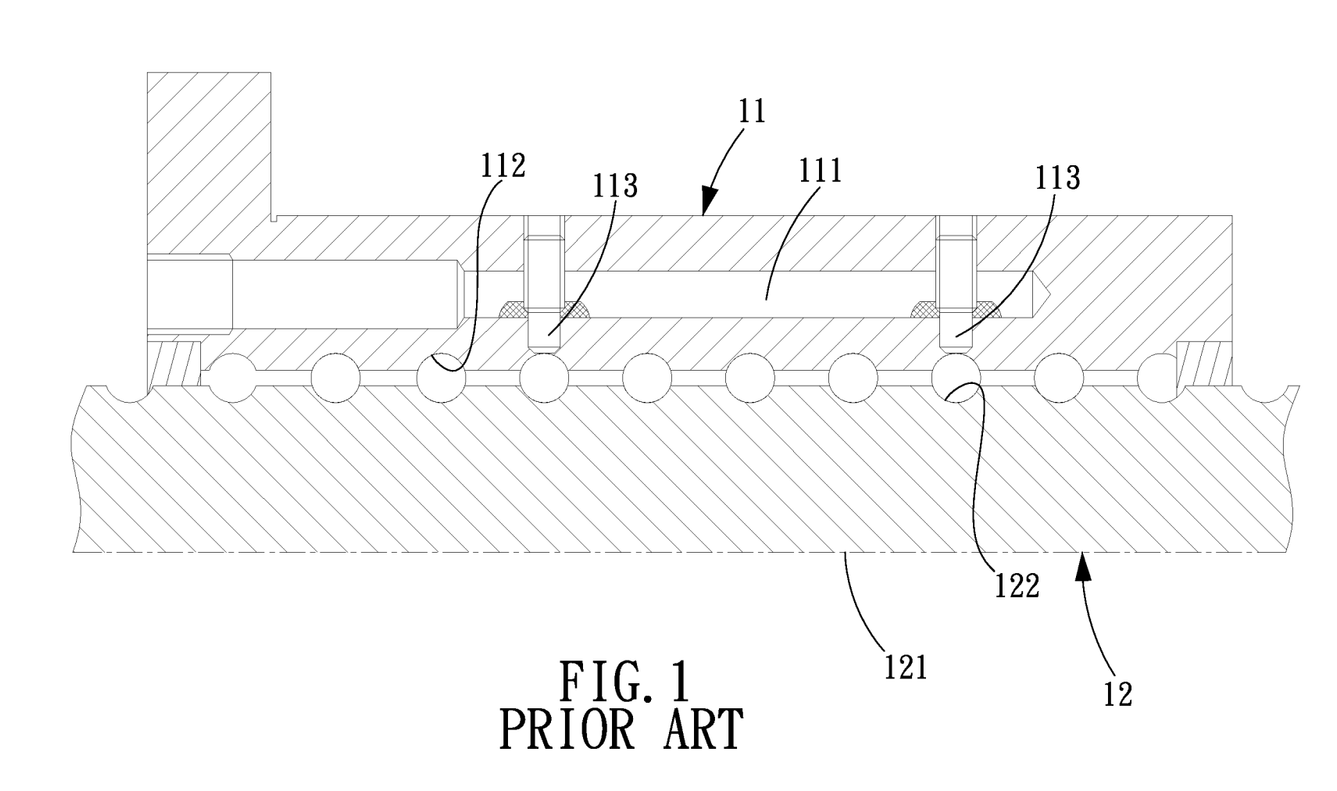
FIG. 1 is a cross sectional view of a conventional ball screw with a lubricating device.

FIG. 1 shows a first type of conventional dust-proof and lubricating device for a ball screw, wherein the nut 11 is formed with a blind hole 111 which is parallel to the axis 121 of the screw 12, then a plurality of radial oil-feeding holes 113 are formed to communicate the blind hole 111 with the helical groove 112 of the nut 11 or the helical groove 122 of the screw 12, so that lubricant oil can be fed into the blind hole 111 and flows to the helical groove 112 of the nut 11 via the radial oil-feeding holes 113. However, when the ball screw is disposed in a vertical position, lubricant oil will be unable to flow through the radial oil-feeding holes 113 into the helical groove 112 of the nut 11 due to the influence of gravity.

Figure 2:
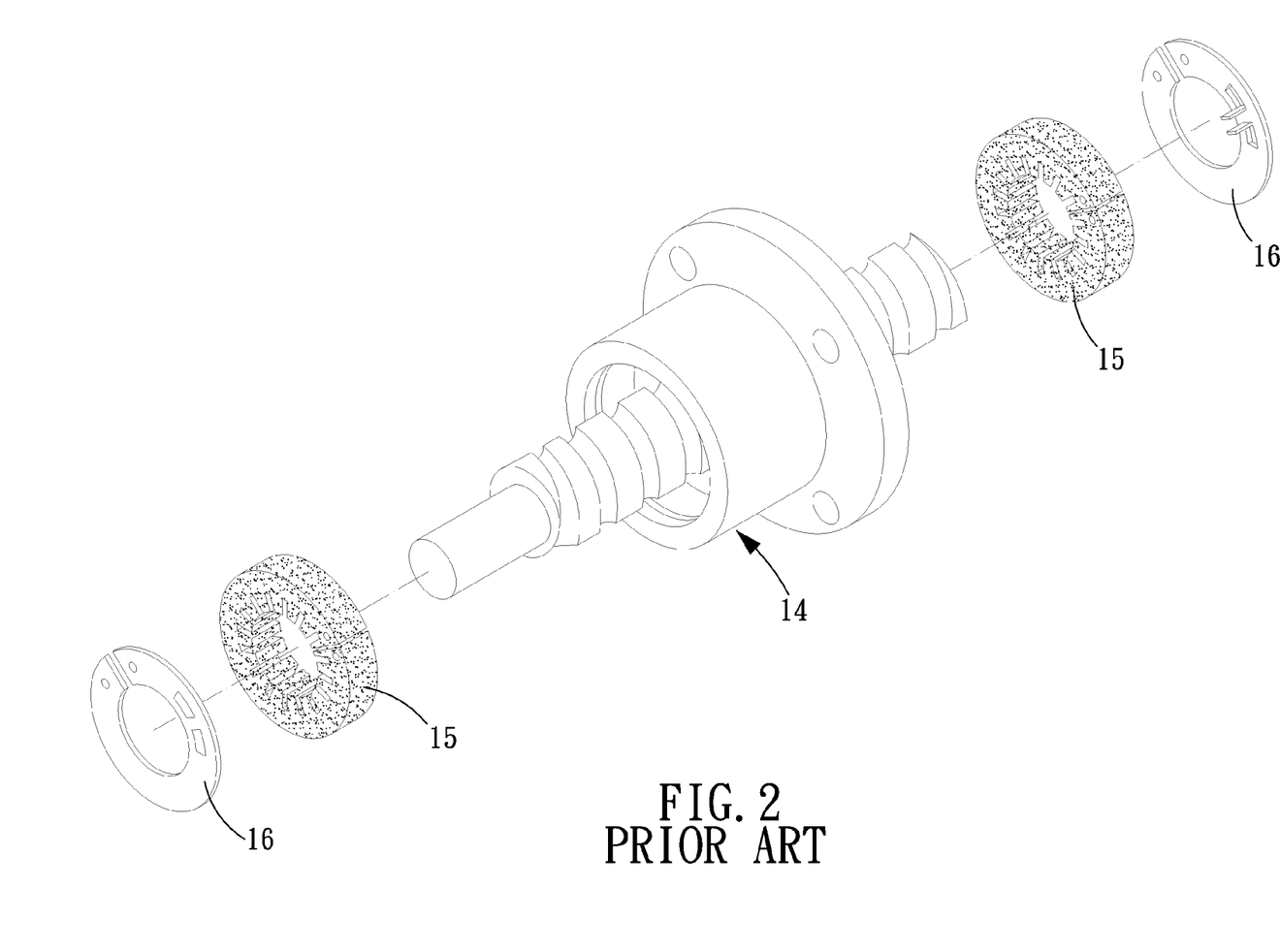
FIG. 2 is an exploded view of another conventional ball screw with a lubricating device.

FIG. 2 shows a second type of conventional dust-proof and lubricating device for a ball screw, wherein a solid lubricant 15 is disposed at both ends of the nut 14, and then covered with a dust-proof member 16, so that the interior of the ball screw can be lubricated by the solid lubricant 15 automatically. The problem is that the solid lubricant 15 needs to be replaced when it is used up, which is inconvenient for the user.

Figure 3:
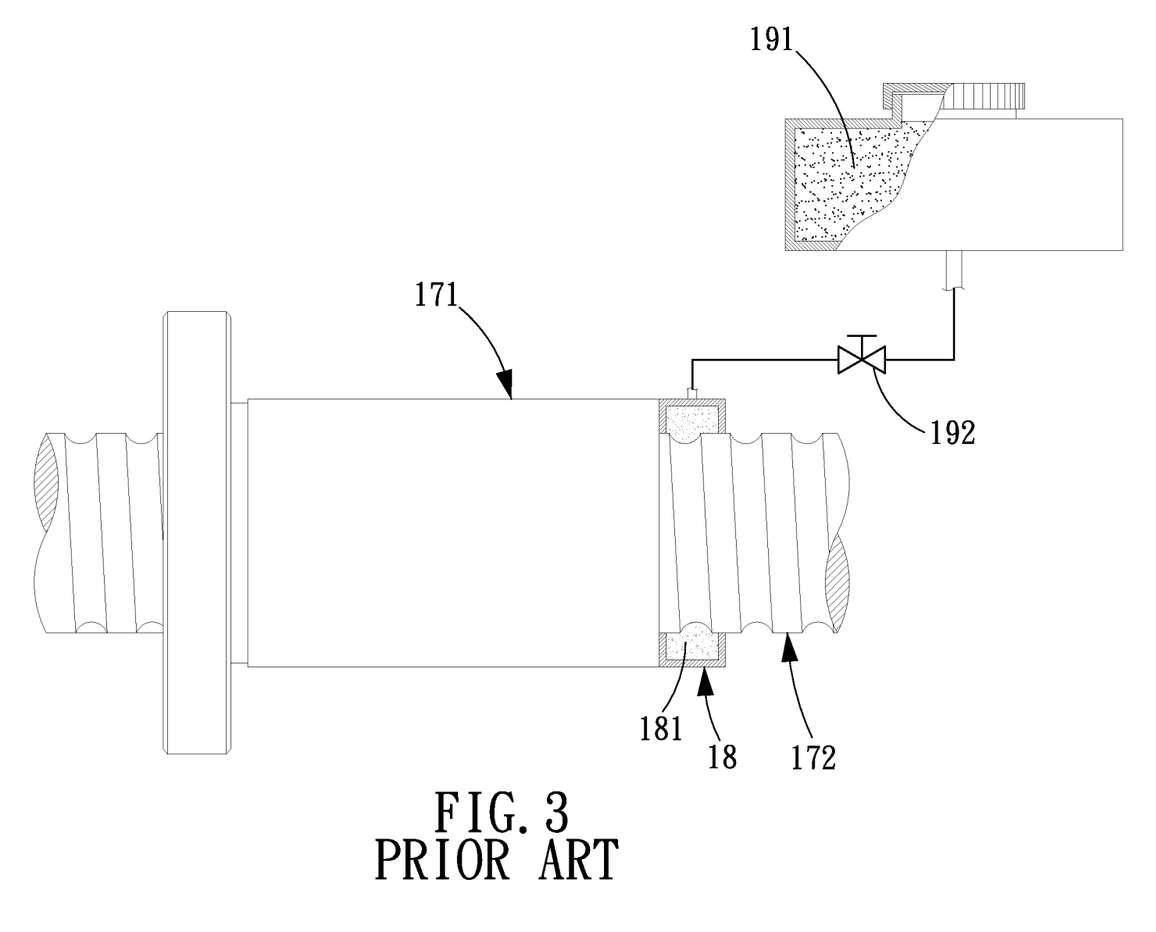
FIG. 3 shows another conventional ball screw with a lubricating device.

FIG. 3 shows a third type of conventional dust-proof and lubricating device for a ball screw, wherein an oil-storage device 18 is disposed at one end of the nut 171 to define an oil-storage space 181 between the outer surface of the screw 172 and the oil-storage device 18. Then, an oil tank 191 is disposed outside the ball screw, and a pump 192 is used to draw oil from the oil tank 191 to the oil-storage device 18. However, arranging the oil-storage device 18 at one end of the nut 171 will add length to the nut 171 while reducing the travel length of the nut.

The present invention has arisen to mitigate and/or obviate the afore-described disadvantages.

SUMMARY OF THE INVENTION

The primary object of the present invention is to provide a ball screw with a dust-proof and lubricating device, wherein the ball screw can still be lubricated when it is disposed in a vertical position.

Another object of the present invention is to provide a ball screw with a dust-proof and lubricating device, wherein the oil-absorbing member doesn't need to be replaced when the oil is used up.

Yet, another object of the present invention is to provide a ball screw with a dust-proof and lubricating device which won't add axial length to the nut and won't reduce the travel length of the ball screw.

To achieve the above object, a ball screw with a dust-proof and lubricating device comprises: a screw, a nut, a plurality of balls, an oil-absorbing member, a return unit, and two dust-proof members. The screw is formed on an outer surface thereof with an outer helical groove. The nut is mounted on the screw and formed with an axial hole with an axis, an inner helical groove which is formed in an inner surface of the axial hole and cooperates with the outer helical groove of the screw to define a load path, an oil-guiding hole parallel to the axis, a plurality of radial oil holes in communication with the oil-guiding hole and the inner helical groove, and an oil-feeding hole in communication with one of the radial oil holes. The balls roll endlessly in the load path. The oil-absorbing member is disposed in the nut and includes a body disposed in the oil-guiding hole, and one end disposed in the radial oil holes. The return unit is disposed in the nut to enable the turning and circulation of the balls. The two dust-proof members are sleeved on the screw and located at both ends of the axial hole.

Preferably, the nut includes an end portion and a flange portion opposite the end portion, and the oil-guiding hole extends from the end portion to the flange portion of the nut.

Preferably, the number of the radial oil holes is two, one of the radial oil holes is formed in the flange portion, and another one of the radial oil holes is formed in the end portion of the nut.

Preferably, the oil-absorbing member is made of felt or polymer.

Preferably, two oil-absorbing rings which are made of the same material as the oil-absorbing member are mounted on the screw and located between the return unit and the dust-proof members, each of the oil-absorbing rings has an outer annular portion disposed in the radial oil holes and an inner annular portion disposed in the outer helical groove of the screw.

Another embodiment of the ball screw with a dust-proof and lubricating device of the present invention comprises a screw, a first nut, a prestressed unit, a second nut, a plurality of balls, an oil-absorbing member, a first return unit, a second return unit, a first dust-proof member, and a second dust-proof member. The screw is formed on an outer surface thereof with an outer helical groove. The first nut is mounted on the screw, and formed with a first axial hole with a first axis, a first inner helical groove which is formed in an inner surface of the first axial hole and cooperates with the outer helical groove of the screw to define a first load path, a first oil-guiding hole parallel to the first axis, a first radial oil hole in communication with the first oil-guiding hole and the first inner helical groove, and an oil-feeding hole in communication with the first radial oil hole. The prestressed unit is sleeved on the screw and located at an end surface of the first nut. The second nut is mounted on the screw to press against the prestressed unit and includes a second axial hole for insertion of the screw, and the second axial hole includes a second axis which is coaxial to the first axis. The second nut is further formed with a second inner helical groove which is formed on an inner surface of the second axial hole to cooperate with the outer helical grooves of the screw to define a second load path connected to the first load path, a second oil-guiding hole parallel to the second axis, and a second radial oil hole in communication with the second oil-guiding hole and the second inner helical groove. The balls roll endlessly in the first and second load paths. The oil-absorbing member is disposed in the first and second nuts and includes a body disposed in the first and second oil-guiding holes, a first end disposed in the first radial oil hole, and a second end disposed in the second radial oil hole. The first return unit is disposed in the first nut to enable turning and circulation of the balls. The second return unit is disposed in the second nut to enable the turning and circulation of the balls. The first dust-proof member is sleeved on the screw and located at one end of the first axial hole of the first nut. The second dust-proof member is sleeved on the screw and located at one end of the second axial hole of the second nut.

Preferably, the first nut includes a flange portion, and the first radial oil hole formed in the flange portion and the oil-feeding hole are formed in the flange portion.

Preferably, the oil-absorbing member is made of felt or polymer.

Preferably, a first and a second oil-absorbing rings which are made of the same material as the oil-absorbing member are mounted on the screw, the first oil-absorbing ring is located between the first return unit and the first dust-proof members and has a first outer annular portion disposed in the first radial oil hole and a first inner annular portion disposed in the outer helical groove of the screw, the second oil-absorbing ring is located between the second return unit and the second dust-proof member and has a second outer annular portion disposed in the second radial oil hole and a second inner annular portion disposed in the outer helical groove of the screw.

Preferably, the oil-absorbing member includes an oil-absorbing piece, a first oil-absorbing bar, and a second oil-absorbing bar, the oil-absorbing piece includes a first end surface and a second end surface and is disposed between the first and second nuts and pressed by the prestressed unit, the first oil-absorbing bar is disposed in the first nut and includes a first body disposed in the first oil-guiding hole, a first end disposed in the first radial oil hole, and a second end for contacting the first end surface of the oil-absorbing piece, the second oil-absorbing bar is disposed in the second nut and includes a second body disposed in the second oil-guiding hole, a first end disposed in the second radial oil hole, and a second end for contacting the second end surface of the oil-absorbing piece.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 4:
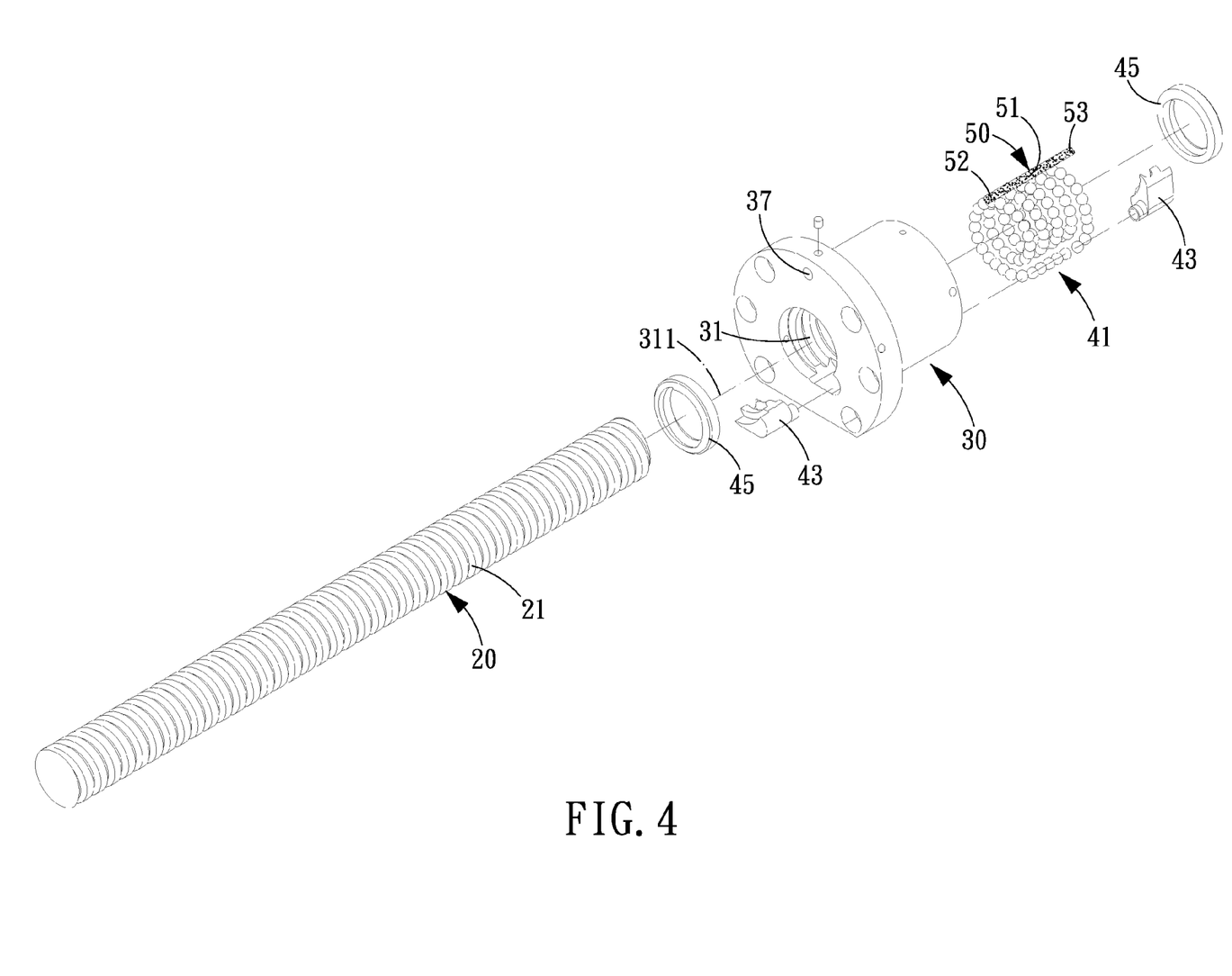
FIG. 4 is an exploded view of a ball screw with a lubricating device in accordance with a first embodiment of the present invention.
Figure 5:
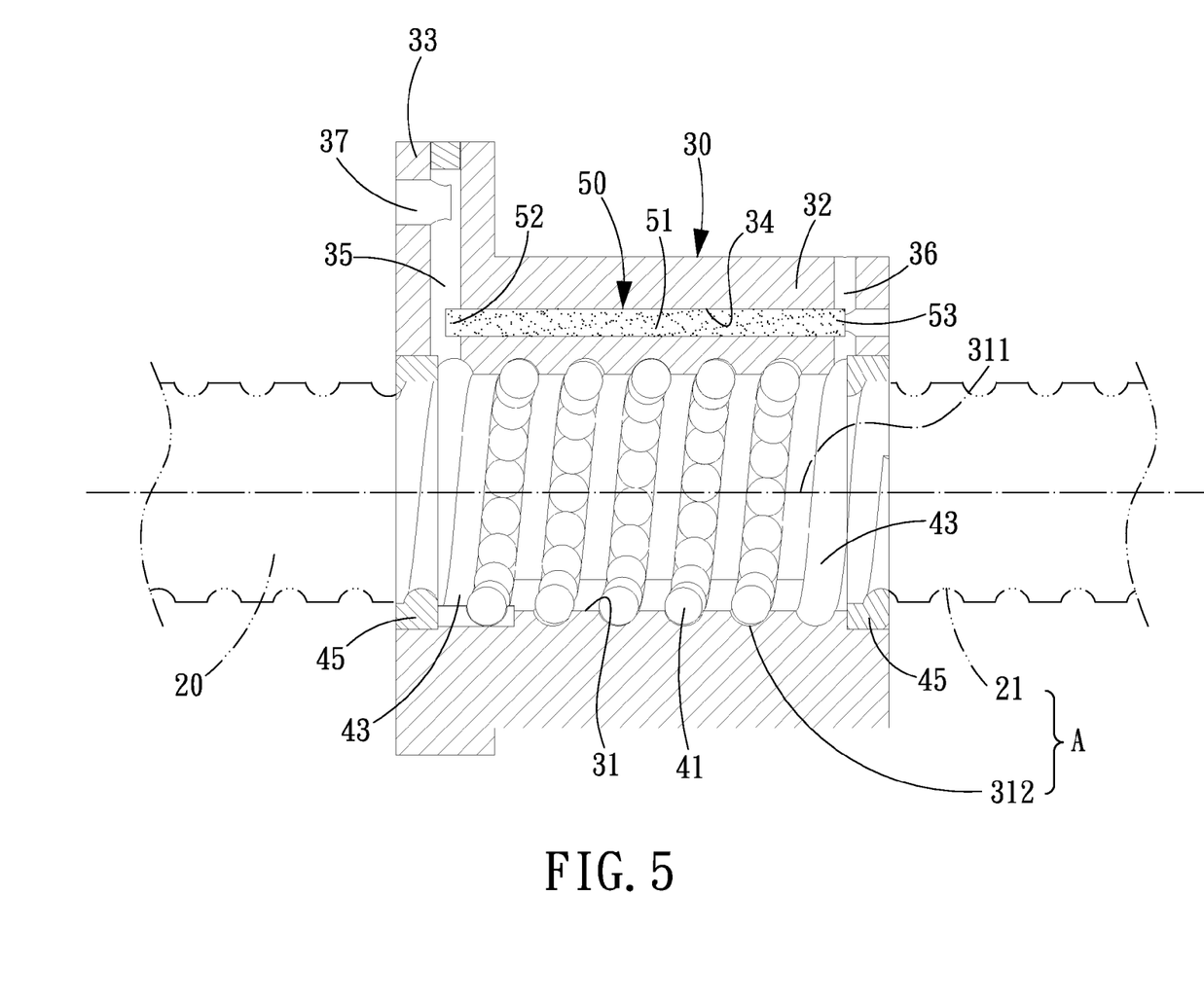
FIG. 5 is a cross sectional view of the ball screw with a lubricating device in accordance with the first embodiment of the present invention.

Referring to FIGS. 4 and 5, a ball screw with a dust-proof and lubricating device in accordance with a first embodiment of the present invention comprises: a screw 20, a nut 30, a plurality of balls 41, an oil-absorbing member 50, a return unit, and two dust-proof members 45.

The screw 20 is formed on the outer surface thereof with an outer helical groove 21.

The nut 30 is mounted on the screw 20, and formed with an axial hole 31 with an axis 311, an inner helical groove 312 which is formed in an inner surface of the axial hole 31 and cooperates with the outer helical groove 21 of the screw 20 to define a load path A, an end portion 32, a flange portion 33 opposite the end portion 32, an oil-guiding hole 34 which extends from the end portion 32 to the flange portion 33 and is parallel to the axis 311, a first radial oil hole 35 formed in the flange portion 33 and in communication with the oil-guiding hole 34 and the inner helical groove 312, a second radial oil hole 36 formed in the end portion 32 and in communication with the oil-guiding hole 34 and the inner helical groove 312, and an oil-feeding hole 37 formed in the flange portion 33 and in communication with the first radial oil hole 35.

The balls 41 roll endlessly in the load path A.

The oil-absorbing member 50 is an elongated structure made of felt or polymer disposed in the nut 30 and includes a body 51 disposed in the oil-guiding hole 34, and two ends 52, 53 disposed in the first and second radial oil holes 35, 36 respectively.

The return unit is disposed in the nut 30 to enable the turning and circulation of the balls 41. In this embodiment, the return unit is two return members 43 which are disposed at both ends of the axial hole 31 of the nut 30. Or, the return members 43 can also be disposed on the axial outer surface of the nut or disposed in any other conventional manners.

The two dust-proof members 45 are sleeved on the screw 20 and located at both ends of the axial hole 31 to press against the two return members 43, so as to prevent dust or dirty oil coming into contact with the balls 41 between the screw 20 and the nut 30.

What mentioned above are the structural relations of the main components of the first embodiment of the present invention, for a better understanding of the operation and assembly of the present invention, please refer to the following description.

As shown in FIG. 5, when the ball screw of the present invention is disposed in a horizontal position, the oil fed into the oil-feeding hole 37 of the nut 30 will flow through the first radial oil hole 35 to the inner helical grooves 312 of the nut 30 to lubricate the balls 41 and the outer helical groove 21 of the screw 20. Meanwhile, the end 52 of the oil-absorbing member 50 disposed in the first radial oil hole 35 will draw oil to another end 53 and finally to the second radial oil hole 36, so that the oil flows to the inner helical groove 312 of the nut 30 through the second radial oil hole 36 to lubricate the balls 41 and the outer helical groove 21 of the screw 20. Hence, the dust-proof and lubricating device of the present invention is capable of effectively lubricating the interior of the ball screw.

The, the dust-proof and lubricating device of the present invention is located inside the nut 30 to cooperate with the oil-absorbing member 50 which is also disposed inside the nut 30, such arrangements won't add axial length to the nut 30 and won't reduce the travel length of the ball screw.

Furthermore, the oil-absorbing member 50 inside the nut 30 serves to transport oil, so it doesn't need to be replaced when the oil is used up.

Figure 6:
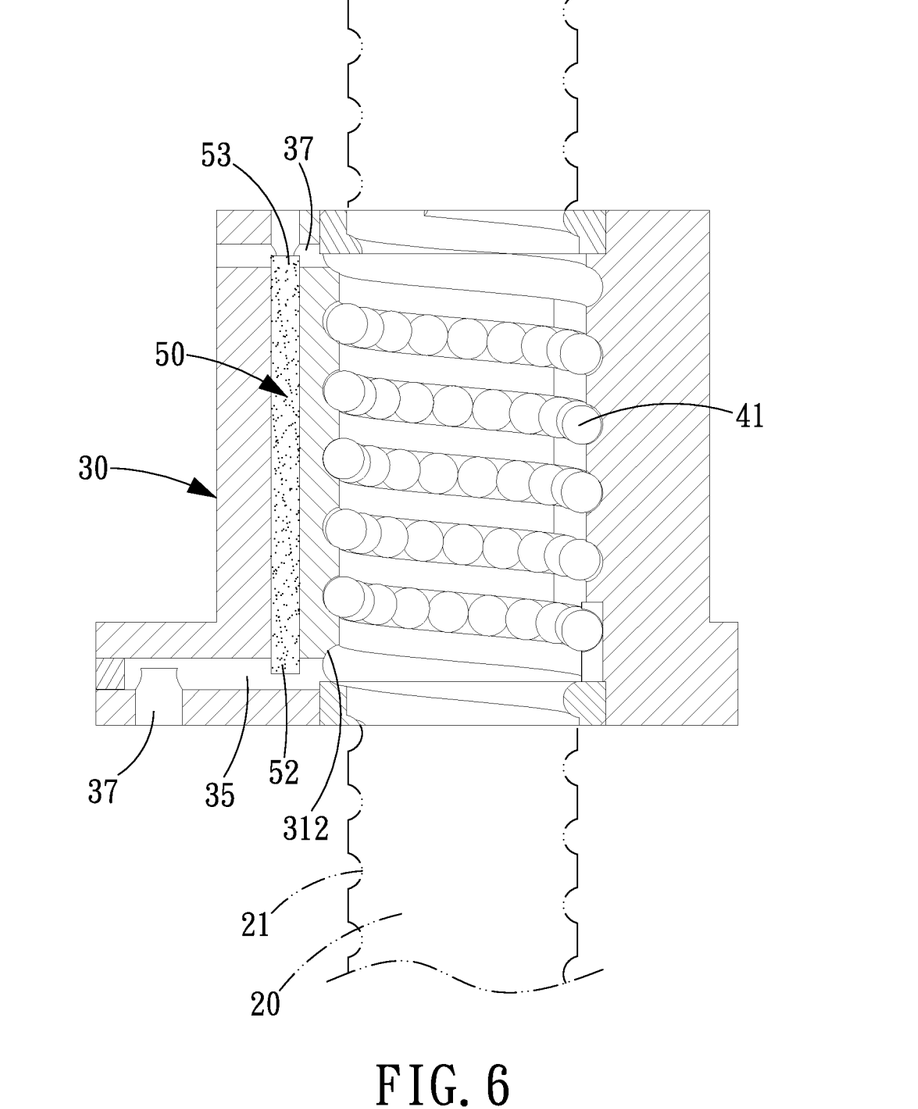
FIG. 6 is an illustrative view of the ball screw with a lubricating device in accordance with the first embodiment of the present invention, wherein the ball screw is in a vertical position.

Referring then to FIG. 6, when the ball screw of the present invention is disposed in a vertical position, the oil fed into the oil-feeding hole 37 of the nut 30 will flow through the first radial oil hole 35 to the inner helical grooves 312 of the nut 30 to lubricate the balls 41 and the outer helical groove 21 of the screw 20. Meanwhile, the end 52 of the oil-absorbing member 50 disposed in the first radial oil hole 35 will absorb the oil (by capillary action), then the oil will overcome gravity and will be drawn to another end 53 and finally to the second radial oil hole 36, so that the oil flows to the inner helical groove 312 of the nut 30 through the second radial oil hole 36 to lubricate the balls 41 and the outer helical groove 21 of the screw 20. Hence, the dust-proof and lubricating device of the present invention is capable of effectively lubricating the interior of the ball screw, even when the ball screw of the present invention is disposed in a vertical position.

Figure 7:
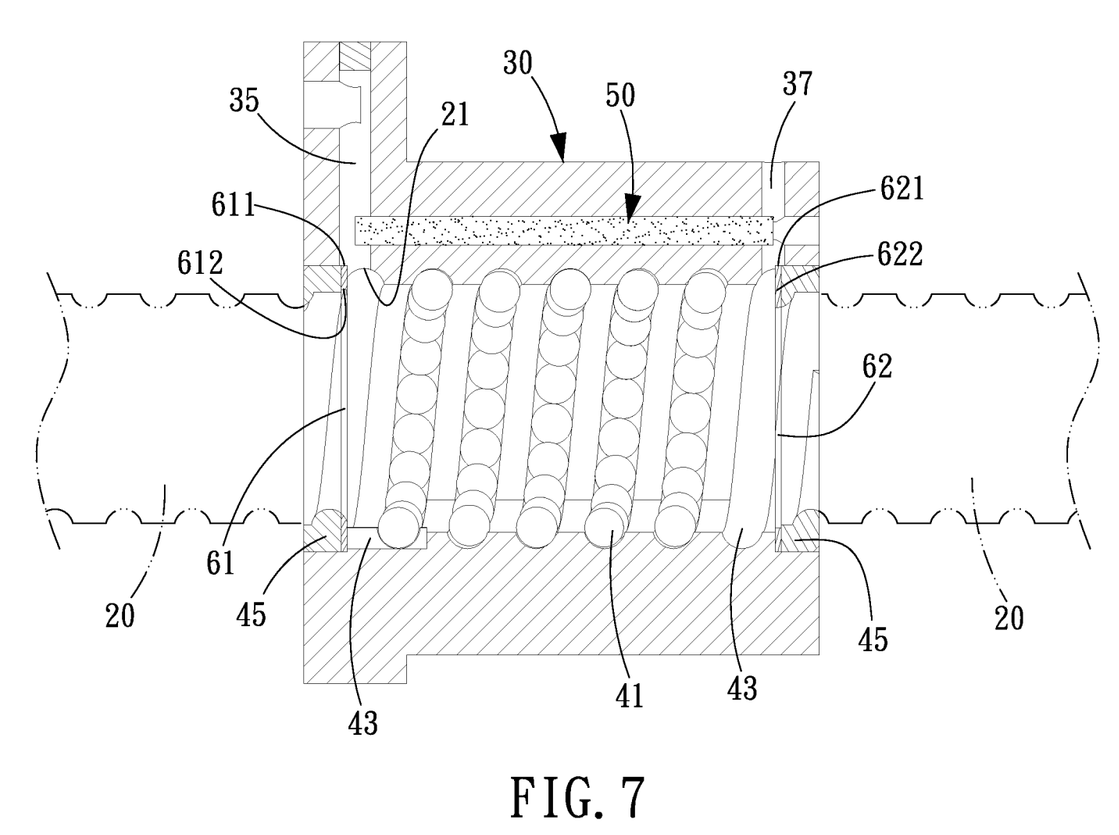
FIG. 7 is a cross sectional view of a ball screw with a lubricating device in accordance with a second embodiment of the present invention.

Referring to FIG. 7, a ball screw with a dust-proof and lubricating device in accordance with a second embodiment of the present invention also comprises: a screw 20, a nut 30, a plurality of balls 41, an oil-absorbing member 50, a return unit, and two dust-proof members 45 and is similar to the first embodiment except that:

On the screw 20 are mounted two oil-absorbing rings 61, 62 which are made of the same material as the oil-absorbing member 50 and located between the return members 43 and the dust-proof members 45. The oil-absorbing ring 61 has an outer annular portion 611 disposed in the first radial oil hole 35 and an inner annular portion 612 disposed in the outer helical groove 21 of the screw 20, and the other oil-absorbing ring 62 has an outer annular portion 621 disposed in the second radial oil hole 36 and an inner annular portion 622 disposed in the outer helical groove 21 of the screw 20. By such arrangements, oil can be absorbed by the outer annular portions 611, 621 and will be transported to the outer helical groove 21 of the screw 20 very quickly.

Figure 8:
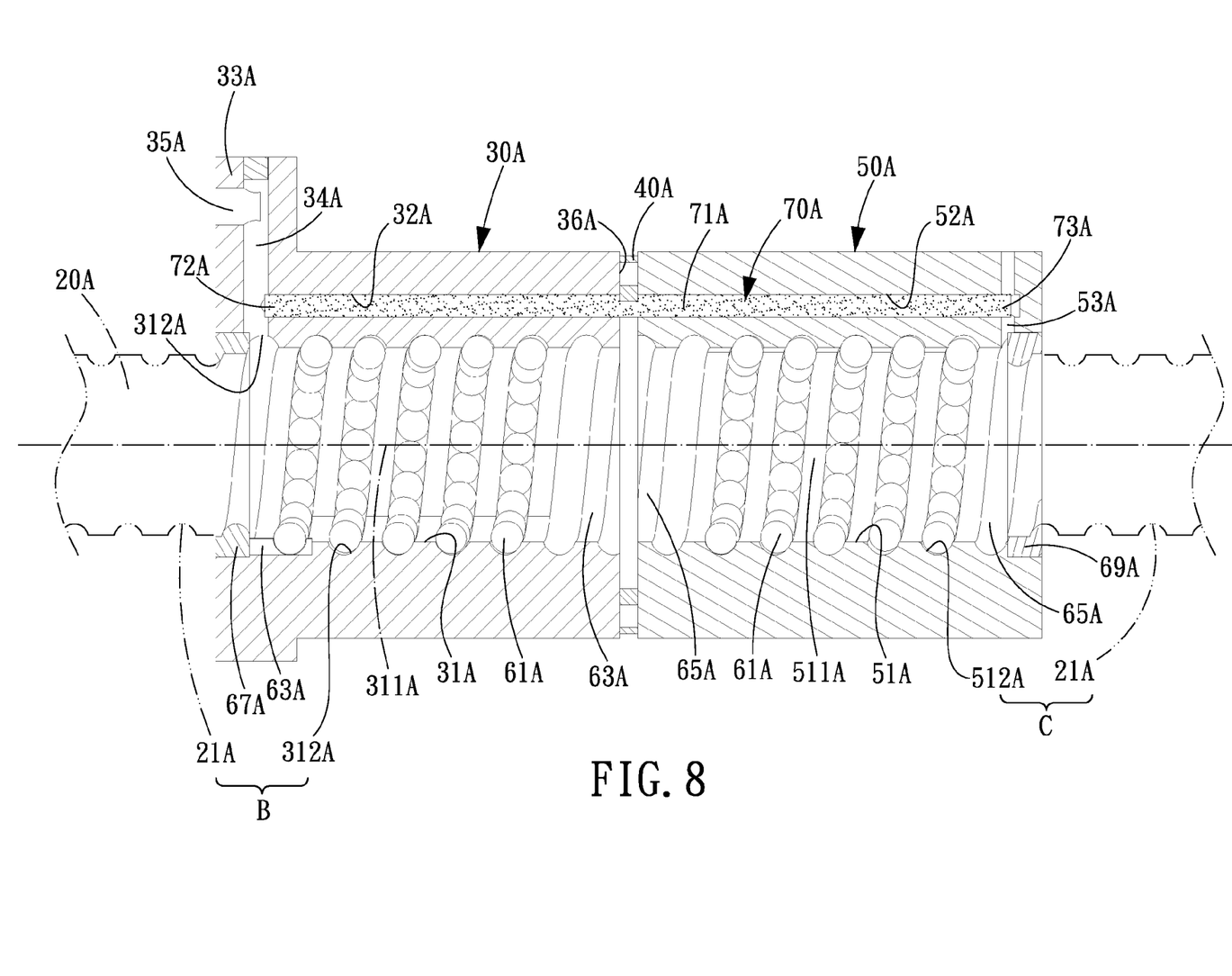
FIG. 8 is a cross sectional view of a ball screw with a lubricating device in accordance with a third embodiment of the present invention.

Referring to FIG. 8, a ball screw with a dust-proof and lubricating device in accordance with a third embodiment of the present invention comprises: a screw 20A, a first nut 30A, a prestressed unit 40A, a second nut 50A, a plurality of balls 61A, an oil-absorbing member 70A, a first return unit, a second return unit, a first dust-proof member 67A, and a second dust-proof member 69A.

The screw 20A is formed on the outer surface thereof with an outer helical groove 21A.

The first nut 30A is mounted on the screw 20A, and formed with a first axial hole 31A with a first axis 311A, a first inner helical groove 312A which is formed in an inner surface of the first axial hole 31A and cooperates with the outer helical groove 21A of the screw 20A to define a first load path B, a first oil-guiding hole 32A parallel to the first axis 311A, a flange portion 33A, a first radial oil hole 34A formed in the flange portion 33A and in communication with the first oil-guiding hole 32A and the first inner helical groove 312A, and an oil-feeding hole 35A formed in the flange portion 33A and in communication with the first radial oil hole 34A.

The prestressed unit 40A includes two C-shaped prestressed pieces and is sleeved on the screw 20A and located at an end surface 36A of the first nut 30A. The end surface 36A is located at one end of the first nut 30A and the flange portion 33A is located at another end of the first nut 30A.

The second nut 50A is mounted on the screw 20A to press against the prestressed unit 40A and includes a second axial hole 51A for insertion of the screw 20A, and the second axial hole 51A has a second axis 511A which is coaxial to the first axis 311A. The second nut 50A is further formed with a second inner helical groove 512A which is formed on an inner surface of the second axial hole 51A to cooperate with the outer helical grooves A of the screw 20A to define a second load path C connected to the first load path B, a second oil-guiding hole 52A parallel to the second axis 511A, and a second radial oil hole 53A in communication with the second oil-guiding hole 52A and the second inner helical groove 512A.

The balls 61A roll endlessly in the first and second load paths B and C.

The oil-absorbing member 70A is disposed in the first and second nuts 30A, 50A and includes a body 71A disposed in the first and second oil-guiding holes 32A, 52A, a first end 72A disposed in the first radial oil hole 34A, and a second end 73A disposed in the second radial oil hole 53A. In this embodiment, the body 71A is slightly deformable when pressed by the prestressed unit 40A.

The first return unit is disposed in the first nut 30A to enable the turning and circulation of the balls 41A. In this embodiment, the first return unit is two first return members 63A which are disposed at both ends of the first axial hole 31A of the first nut 30A. Or, the return members 63A can also be disposed on the axial outer surface of the nut or disposed in any other conventional manners.

The second return unit is disposed in the second nut 50A to enable the turning and circulation of the balls 41A. In this embodiment, the second return unit is two second return members 65A which are disposed at both ends of the second axial hole 51A of the second nut 50A. Or, the second return members 65A can also be disposed on the axial outer surface of the nut or disposed in any other conventional manners.

The first dust-proof member 67A is sleeved on the screw 20A and located at one end of the first axial hole 31A of the first nut 30A to press against the first return member 63A.

The second dust-proof member 69A is sleeved on the screw 20A and located at one end of the second axial hole 51A of the second nut 50A to press against the second return member 65A.

Figure 9:
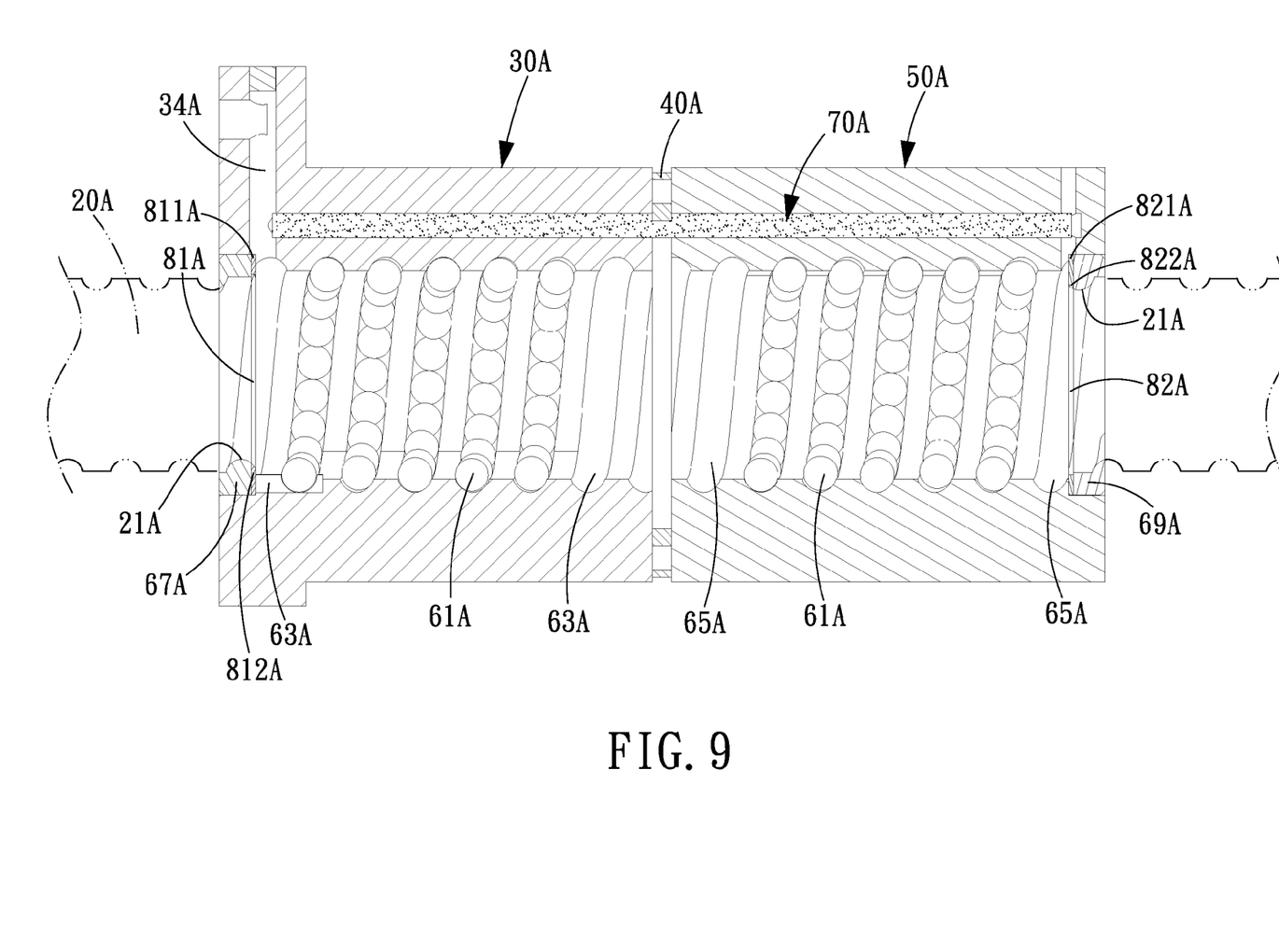
FIG. 9 is a cross sectional view of a ball screw with a lubricating device in accordance with a fourth embodiment of the present invention.

Referring to FIG. 9, a ball screw with a dust-proof and lubricating device in accordance with a fourth embodiment of the present invention also comprises: a screw 20A, a first nut 30A, a prestressed unit 40A, a second nut 50A, a plurality of balls 61A, an oil-absorbing member 70A, two first return members 63A, two second return members 65A, a first dust-proof member 67A, and a second dust-proof member 69A. The ball screw with a dust-proof and lubricating device of the fourth embodiment is similar to the third embodiment, except that:

On the screw 20A are mounted a first and second oil-absorbing rings 81A, 82A which are made of the same material as the oil-absorbing member 70A. The first oil-absorbing ring 81A is located between the first return members 63A and the first dust-proof members 67A and has a first outer annular portion 811A disposed in the first radial oil hole 34A and a first inner annular portion 812A disposed in the outer helical groove 21A of the screw 20A. The second oil-absorbing ring 82A is located between the second return members 65A and the second dust-proof members 69A and has a second outer annular portion 821A disposed in the second radial oil hole 53A and a second inner annular portion 822A disposed in the outer helical groove 21A of the screw 20A.

Figure 10:
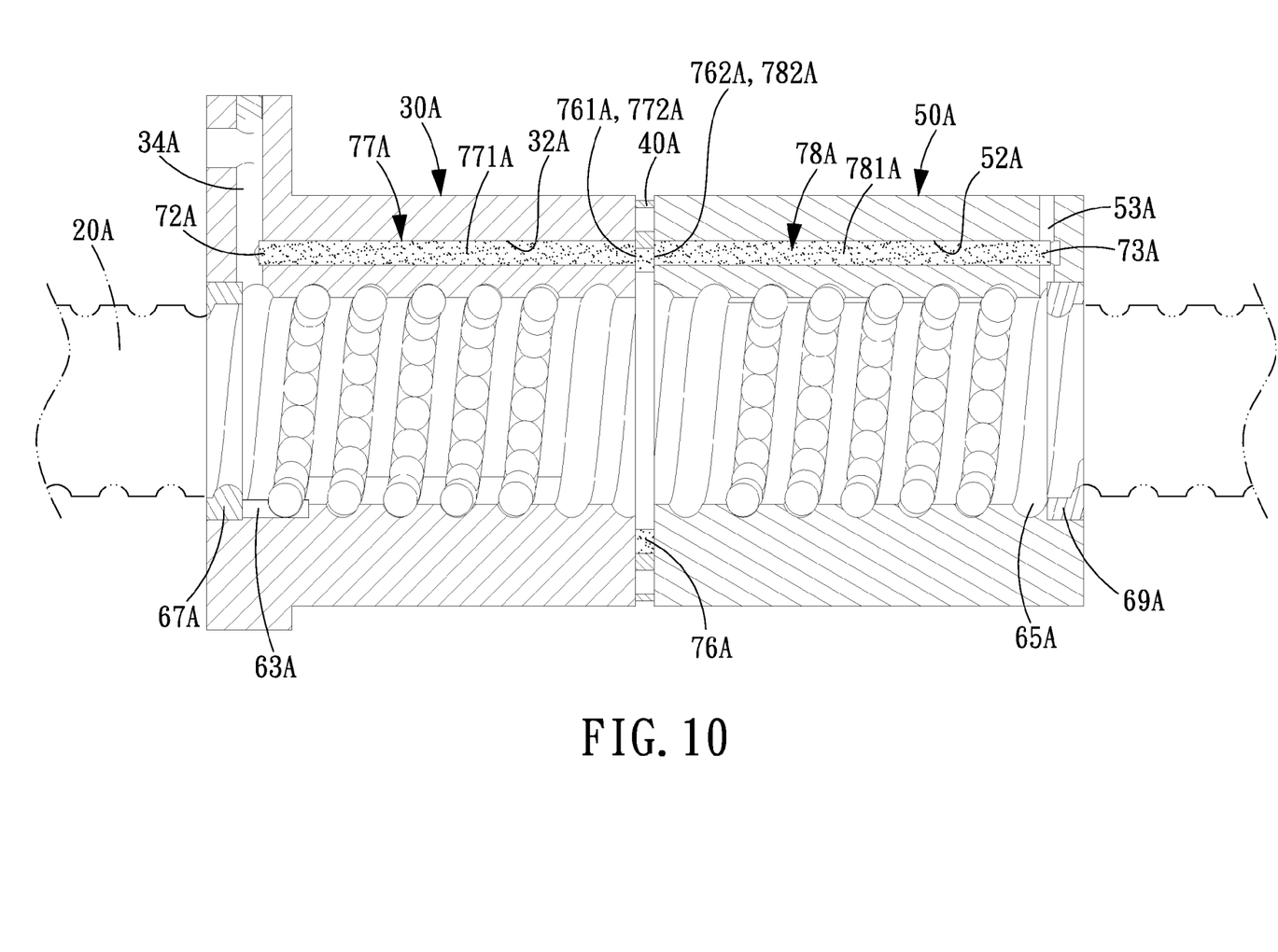
FIG. 10 is a cross sectional view of a ball screw with a lubricating device in accordance with a fifth embodiment of the present invention.

Referring to FIG. 10, a ball screw with a dust-proof and lubricating device in accordance with a fifth embodiment of the present invention also comprises: a screw 20A, a first nut 30A, a prestressed unit 40A, a second nut 50A, a plurality of balls 61A, an oil-absorbing member, two first return members 63A, two second return members 65A, a first dust-proof member 67A, and a second dust-proof member 69A. The ball screw with a dust-proof and lubricating device of the fourth embodiment is similar to the third embodiment, except that:

The oil-absorbing member includes an oil-absorbing piece 76A, a first oil-absorbing bar (which is an elongated structure) 77A, and a second oil-absorbing bar 78A.

The oil-absorbing piece 76A is disposed between the first and second nuts 30A, 50A, pressed by the prestressed unit 40 and include a first end surface 761A and a second end surface 762A.

The first oil-absorbing bar 77A is disposed in the first nut 30A and includes a first body 771A disposed in the first oil-guiding hole 32A, a first end 72A disposed in the first radial oil hole 34A, and a second end 772A for contacting the first end surface 761A of the oil-absorbing piece 76A.

The second oil-absorbing bar 78A is disposed in the second nut 50A and includes a second body 781A disposed in the second oil-guiding hole 52A, a first end 73A disposed in the second radial oil hole 53A, and a second end 782A for contacting the second end surface 762A of the oil-absorbing piece 76A.

What mentioned above are the structural relations of the main components of the first embodiment of the present invention, for a better understanding of the operation and assembly of the present invention, please refer to the following description.

While we have shown and described various embodiments in accordance with the present invention, it is clear to those skilled in the art that further embodiments may be made without departing from the scope of the present invention.

What is claimed is:

1. A ball screw with a dust-proof and lubricating device comprising:
    a screw formed on an outer surface thereof with an outer helical groove;
    a first nut mounted on the screw, and formed with a first axial hole with a first axis, a first inner helical groove which is formed in an inner surface of the first axial hole and cooperates with the outer helical groove of the screw to define a first load path, a first oil-guiding hole parallel to the first axis, a first radial oil hole in communication with the first oil-guiding hole and the first inner helical groove, and an oil-feeding hole in communication with the first radial oil hole;
    a prestressed unit sleeved on the screw and located at an end surface of the first nut;
    a second nut mounted on the screw to press against the prestressed unit and including a second axial hole for insertion of the screw, and the second axial hole including a second axis which is coaxial to the first axis, the second nut being further formed with a second inner helical groove which is formed on an inner surface of the second axial hole to cooperate with the outer helical grooves of the screw to define a second load path connected to the first load path, a second oil-guiding hole parallel to the second axis, and a second radial oil hole in communication with the second oil-guiding hole and the second inner helical groove;
    a plurality of balls rolling endlessly in the first and second load paths;
    an oil-absorbing member disposed in the first and second nuts and including a body disposed in the first and second oil-guiding holes, a first end disposed in the first radial oil hole, and a second end disposed in the second radial oil hole;
    at least one first return unit disposed in the first nut to enable turning and circulation of the balls;
    at least one second return unit disposed in the second nut to enable turning and circulation of the balls;
    a first dust-proof member sleeved on the screw and located at one end of the first axial hole of the first nut; and
    a second dust-proof member sleeved on the screw and located at one end of the second axial hole of the second nut.

2. The ball screw with a dust-proof and lubricating device as claimed in claim 1, wherein the first nut includes a flange portion, and the first radial oil hole formed in the flange portion and the oil-feeding hole are formed in the flange portion.

3. The ball screw with a dust-proof and lubricating device as claimed in claim 1, wherein the oil-absorbing member is made of felt or polymer.

4. The ball screw with a dust-proof and lubricating device as claimed in claim 1, wherein the oil-absorbing member includes an oil-absorbing piece, a first oil-absorbing bar, and a second oil-absorbing bar, the oil-absorbing piece includes a first end surface and a second end surface and is disposed between the first and second nuts and pressed by the prestressed unit, the first oil-absorbing bar is disposed in the first nut and includes a first body disposed in the first oil-guiding hole, a first end disposed in the first radial oil hole, and a second end for contacting the first end surface of the oil-absorbing piece, the second oil-absorbing bar is disposed in the second nut and includes a second body disposed in the second oil-guiding hole, a first end disposed in the second radial oil hole, and a second end for contacting the second end surface of the oil-absorbing piece.

* * * * *